United States Patent Office 3,817,718
Patented June 18, 1974

3,817,718
PROCESS FOR THE RECOVERY OF AMMONIUM SULPHATE FROM AN AQUEOUS AMMONIUM SULPHATE SOLUTION CONTAINING METHIONINE
Georg J. J. Maass, Sittard, and Hendrik A. Korpel, Geleen, Netherlands, assignors to Stamicarbon N.V., Heerlen, Netherlands
No Drawing. Filed Apr. 10, 1969, Ser. No. 815,226
Claims priority, application Netherlands, Apr. 10, 1968, 6805152
Int. Cl. B01d 9/02; C01b 21/54; C07c 103/52
U.S. Cl. 23—302
2 Claims

ABSTRACT OF THE DISCLOSURE

A process for recovering ammonium sulphate from an aqueous solution of ammonium sulphate and methionine is disclosed, wherein the ammonium sulphate is recovered from the solution by crystallization at a weight ratio of methionine/ammonium sulphate of between 0.01 and 0.3, and at a pH of between 0.2 and 6. The ammonium sulphate recovered by the crystallization step contains less than 1% by weight of methionine, and is in a form suited for fertilizer production.

---

The present invention relates to a process for the recovery of ammonium sulphate from an aqueous solution which contains ammonium sulphate and methionine.

A known process for the preparation of methionine comprises hydrolysing methionine nitrile with sulphuric acid and thereafter neutralising the aqueous hydrolysis mixture with ammonia, to form methionine and ammonium sulphate (see U.S. Pat. 3,131,210). The ammonium sulphate, which is thus produced in a fairly large amount compared with the amount of methionine, should, to ensure a good economy of the process, be recovered, with a minimum content of methionine, in a form suited for fertilizer production. Hence, it is important, in the production of methionine by the abovementioned process, to have available a method for effecting a good separation between the methionine and the ammonium sulphate.

According to a process disclosed in U.S. Pat. 2,071,282, ammonium sulphate can be precipitated from an aqueous solution of ammonium sulphate and an amino acid, by adding ammonia to the solution. Upon removal of the precipitated ammonium sulphate, the amino acid in the remaining solution can be partly crystallized out. If this known procedure is used for precipitating ammonium sulfate from an aqueous solution of ammonium sulphate and methionine, it is essential, for dissolving sufficient ammonia in the solution, to operate under elevated pressure, and in the further processing of the resulting suspension ammonia losses are incurred.

According to another process (see U.S. Pat. 2,564,105), a solution containing methionine and ammonium sulphate is evaporated to dryness under reduced pressure, whereupon the solid residue obtained is extracted several times with liquid ammonia. The methionine dissolves in the liquid ammonia, and can be recovered from the solution by evaporation of the ammonia. This process is however very laborious and involves a high energy consumption.

It has now been found that from an aqueous solution containing ammonium sulphate and methionine with a weight ratio methionine/ammonium sulphate of between 0.01 and 0.3, and at a pH of between 0.2 and 6, ammonium sulphate with less than 1% by weight of methionine can be recovered by crystallization. To that end the crystallization temperature should be taken above a minimum value, which depends on the weight ratio methionine/ammonium sulphate and the pH. According as, within the above-mentioned limits, the weight methionine/ammonium sulphate and/or the pH is (are) higher, a higher minimum crystallization temperature should be used to enable ammonium sulphate with a methionine content of below 1% by weight to be recovered from the solution.

Generally, the crystallization temperature will be from about 30 to about 110° C. Clearly, the water content of the solution must be such that crystallization will take place at the required temperature. Generally, the solution will contain too much water and excess water must then be removed by evaporation. It is possible, however, that in the preparation of methionine an aqueous solution containing methionine and ammonium sulphate is produced wherein the water content is of the required value. Although the required water content varies with the weight ratio of methionine/ammonium sulphate, the pH, and the crystallization temperature, in general the water content will be within the range of 35 to 60 weight percent water in the aqueous solution.

The invention consequently provides a process for the recovery of ammonium sulphate from an aqueous ammonium sulphate solution containing 1–30 g. of methionine per 100 g. of ammonium sulphate, which does not have the drawbacks attaching to the abovementioned known processes, and which is characterized in that at a pH of between 0.2 and 6 ammonium sulphate with a methionine content of below 1% by weight is removed from the solution by crystallization.

Preference is given to a pH of between 1.0 and 3.5 because it is possible then, under otherwise identical conditions, to crystallize a larger amount of ammonium sulphate of the same low methionine content.

The preparation of methionine, with application of the ammonium sulphate recovery according to the invention, can be carried out in several ways. For example, after the formation of methionine and ammonium sulphate, part of the methionine may be removed by crystallization in a known manner and, thereupon, ammonium sulphate be recovered from the remaining parent liquor by the process according to the invention. The parent liquor left after recovery of the ammonium sulphate may then be recycled in the process. It is also possible, after the formation of methionine and ammonium sulphate, first to recover ammonium sulphate by the process according to the invention, and subsequently, to strip the remaining parent liquor, diluted with water or an aqueous solution, of methionine by crystallization, and finally to recycle the parent liquor left after the said methionine stripping.

In the following examples the invention will be elucidated further without being restricted thereto.

EXAMPLE I 161 g. of an aqueous solution containing 1.8 g. of methionine and 59.3 g. of ammonium sulphate and having a pH of appr. 5, is evaporated under atmospheric pressure. After evaporation of 60 g. of water, the precipitate is filtered off at 100° C. The solid so obtained is washed with 30 ml. of a saturated aqueous ammonium sulphate solution and subsequently dried at 70° C. and 50 mm. Hg. This yields 27.8 g. of ammonium sulphate with 0.6% by weight of methionine.

EXAMPLE II 2 g. of concentrated sulphuric acid (96% by weight) are added to 200 g. of an aqueous solution containing 5.4 g. of methionine and 62.4 g. of ammonium sulphate and having a pH equal to 3.8. After the addition, the pH of the solution is 2.0.

Subsequently, 65 g. of water are removed from the solution by evaporation at atmospheric pressure. Then, the solution is cooled to 50° C. and the crystallized solid material filtered off at that temperature. Washing the isolated solid with 20 ml. of a saturated aqueous ammonium sulphate solution and drying it under the same conditions as in example I, yields 14.3 g. of ammonium sulphate with a methionine content of 0.4% by weight.

EXAMPLE III 2.5 g. of concentrated sulphuric acid (96% by weight) are added to a solution containing 252 g. of water, 8 g. of methionine and 140 g. of ammonium sulphate. The pH of the solution then equals 1.5. Subsequently, the solution is evaporated at appr. 50° C. and 100 mm. Hg. After 133 g. of water have evaporated, the suspension is filtered at appr. 50° C.

The isolated solid is washed and dried in the same way as in example I.

This gives a yield of 40.3 g. of ammonium sulphate with a methionine content of 0.1% by weight.

EXAMPLE IV

A solution of 280.5 g. of water, 39.5 g. of methionine, 200 g. of ammonium sulphate and 22 g. of sulphuric acid, with a pH=2.0, is evaporated at appr. 105° C. and atmospheric pressure until 110 g. of water have been driven off. The resulting suspension is filtered at approximately the same temperature.

The isolated solid is washed and dried in the same way as in example I.

This gives a yield of 64 g. of ammonium sulphate with a methionine content of 0.4% by weight.

What is claimed is:

1. A process for recovering ammonium sulphate from an aqueous ammonium sulphate solution containing from 1 to 30 g. of methionine per 100 g. of ammonium sulphate, said process comprising crystallizing ammonium sulphate from said solution at a temperature of from 30 to about 100° C., wherein said solution has a water content within the range of 35–60 weight percent, based on the total weight of said solution, at a pH of between 1 and 3.5, whereby ammonium sulphate with a methionine content of less than 1% by weight is recovered.

2. The process as claimed in claim 1, wherein the methionine content of the recovered ammonium sulphate is at most 0.6% by weight.

References Cited

UNITED STATES PATENTS

| | | | |
|---|---|---|---|
| 2,443,391 | 6/1948 | Kirkpatrick | 260—534 S |
| 2,485,236 | 10/1949 | Gresham et al. | 260—465.5 |
| 2,504,425 | 4/1950 | Kralovec | 260—465.5 |
| 2,656,248 | 10/1953 | Simms | 23—119 |
| 3,366,681 | 1/1968 | Thoma et al. | 23—119 |
| 3,446,835 | 5/1969 | Thoma et al. | 260—534 |

NORMAN YUDKOFF, Primary Examiner

R. T. FOSTER, Assistant Examiner

U.S. Cl. X.R.

260—465.5, 534 S; 423—545